US008032137B1

(12) United States Patent
Virtanen

(10) Patent No.: US 8,032,137 B1
(45) Date of Patent: Oct. 4, 2011

(54) RADIO NETWORK ACCESS MECHANISM

(75) Inventor: Kari Virtanen, Tampere (FI)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 09/381,334

(22) PCT Filed: Jan. 28, 1999

(86) PCT No.: PCT/FI99/00057
§ 371 (c)(1),
(2), (4) Date: Nov. 18, 1999

(87) PCT Pub. No.: WO99/39534
PCT Pub. Date: Aug. 5, 1999

(30) Foreign Application Priority Data

Jan. 28, 1999 (FI) .......................................... 980185

(51) Int. Cl.
*H04W 8/02* (2009.01)
(52) U.S. Cl. ...................... 455/433; 455/432.3; 370/352
(58) Field of Classification Search .................. 455/466, 455/426, 433, 414, 422, 435, 432, 432.1–432.3, 455/435.1–435.3, 411, 444, 560; 370/328, 370/338, 432, 329, 326, 352, 379, 331
See application file for complete search history.

(56) References Cited

U.S. PATENT DOCUMENTS

| 5,619,552 | A | * | 4/1997 | Karppanen et al. ............ 455/433 |
| 5,862,480 | A | * | 1/1999 | Wild et al. ................... 455/432.2 |
| 5,918,177 | A | * | 6/1999 | Corriveau et al. .......... 455/432.3 |
| 5,943,619 | A | * | 8/1999 | Coyne et al. .................. 455/432 |
| 5,946,619 | A | * | 8/1999 | Kolev ......................... 455/432.1 |
| 5,946,630 | A | * | 8/1999 | Willars et al. ................. 370/410 |
| 6,032,044 | A | * | 2/2000 | Shannon et al. .............. 455/414 |
| 6,047,194 | A | * | 4/2000 | Andersson ..................... 370/329 |
| 6,061,346 | A | * | 5/2000 | Nordman ...................... 370/352 |
| 6,064,875 | A | * | 5/2000 | Morgan ........................ 455/410 |
| 6,097,950 | A | * | 8/2000 | Bertacchi .................... 455/432.2 |
| 6,097,962 | A | * | 8/2000 | Corriveau et al. ............ 455/432 |
| 6,104,929 | A | * | 8/2000 | Josse et al. .................... 370/379 |
| 6,222,829 | B1 | * | 4/2001 | Karlsson et al. .............. 370/329 |
| 6,226,523 | B1 | * | 5/2001 | Karlsson et al. .............. 455/466 |
| 6,370,390 | B1 | * | 4/2002 | Salin et al. ..................... 455/426 |

(Continued)

FOREIGN PATENT DOCUMENTS

GB 2 322 521 8/1998

(Continued)

*Primary Examiner* — Kamran Afshar
*Assistant Examiner* — Khawar Iqbal
(74) *Attorney, Agent, or Firm* — Harrington & Smith

(57) ABSTRACT

A method of registration in a telecommunications system by a mobile station, which system includes a home location register for maintaining subscriber data and supports a first network, such as GSM, and a second network, such as GPRS. The home location register maintains the mobile subscriber data and a message is sent to the home location register for requesting the mobile subscriber data. The home location register maintains an access parameter which indicates whether the mobile subscriber is entitled to use the first network, the second network or both networks. In response to said message for requesting the subscriber data, the home location register sends the mobile subscriber data and also the access parameter. The network element that requested the mobile subscriber data uses said access parameter for restricting the access of the mobile subscriber only to a circuit-switched network and/or to a packet-switched network.

16 Claims, 3 Drawing Sheets

U.S. PATENT DOCUMENTS

| | | | |
|---|---|---|---|
| 6,400,946 B1 * | 6/2002 | Vazvan et al. | 455/432.1 |
| 6,560,455 B2 * | 5/2003 | Amin et al. | 455/432.3 |
| 2002/0058506 A1 * | 5/2002 | Amin et al. | 455/432 |
| 2003/0039237 A1 * | 2/2003 | Forslow | 370/352 |

FOREIGN PATENT DOCUMENTS

| | | |
|---|---|---|
| WO | 97/26764 | 7/1997 |
| WO | 97/40638 | 10/1997 |

* cited by examiner

RADIO NETWORK ACCESS MECHANISM

This application is the national phase of international application PCT/FI99/00057 filed Jan. 28, 1999.

BACKGROUND OF THE INVENTION

The invention relates to reduction of signalling load when a multi-mode (e.g. GSM/GPRS) mobile station registers in a packet radio network, such as GPRS. The invention is described in connection with a dual-mode telecommunications system which supports two different networks. To clarify the description, it is assumed that the first network is a circuit-switched network (such as GSM) and the second network is a packet-switched network (such as GPRS). Instead of the GSM network, or in addition to it, derivatives of the GSM, such as DCS, may also be used.

A General Packet Radio Service (GPRS) is a new service in the GSM. It is one of the items that is being standardized in GSM phase 2+ in the ETSI (European Telecommunication Standard Institute). The GPRS operational environment consists of one or more sub-network service areas that are interconnected using a GPRS backbone network. A sub-network comprises a number of packet data service nodes, which are here called GPRS support nodes (or agents) and each one of which is connected to the GSM mobile network so that it can provide packet data service for mobile data terminals via several base stations, i.e. cells. An intermediate mobile network provides circuit-switched or packet-switched data transmission between a support node and the mobile data terminals. Different sub-networks, in turn, are connected to an external data network, for example to a Public Switched Packet Data Network PSPDN. The GPRS service can thus be used for effecting packet data transmission between mobile data terminals and external data networks, when the GSM network functions as an access network. One feature of the GPRS service network is that it operates almost independently of the GSM network. One of the requirements set for the GPRS service is that it must operate together with different types of external PSPDN networks, such as the Internet and X.25 networks. In other words, the GPRS service and the GSM network should be able to serve all users, irrespective of the type of data networks that they wish to be connected to via the GSM network. This means that the GSM network and GPRS service must support and process different network addressing methods and data packet formats. The data packet processing also comprises routing of the packets in a packet radio network. In addition, the users should be able to roam from their home GPRS network to a visited GPRS network.

FIG. 1 illustrates a typical arrangement in a GPRS network. It should be understood that the architecture of the GPRS networks is not as mature as that of the GSM networks. All GPRS terms should therefore be understood as being descriptive terms rather than limiting ones. A typical mobile station forming a mobile data terminal consists of a mobile station MS of a mobile network and of a portable computer PC connected to the data interface of the MS. The mobile station may be, for example, a Nokia 2110, manufactured by Nokia Mobile Phones Ltd., Finland. By means of a PCMCIA type Nokia Cellular Datacard, manufactured by Nokia Mobile Phones Ltd., the mobile station can be connected to any portable personal computer PC whatsoever that has a PCMCIA card slot. The PCMCIA card thus provides the PC with an access point that supports the protocol of the telecommunications application used in the PC, such as the CCITT X.25 or Internet Protocol IP. Alternatively, the mobile station can directly provide an access point that supports the protocol used by the PC application. Further, a mobile station 3 and a PC 4 can be integrated to form a single unit, within which the application is provided with an access point that supports the protocol used by it. An example for such a mobile station with an integrated computer is a Nokia Communicator 9000, manufactured by Nokia Mobile Phones Ltd., Finland.

Network elements BSC and MSC are previously known from a typical GSM network. The arrangement of FIG. 1 comprises a separate Serving GPRS Support Node SGSN. The support node controls certain operations of the packet radio service on the network side. The operations include the logging on and off the system by the mobile stations MS, updating of the routing areas of the mobile stations MS, and routing of the data packets to correct destinations. In the present application, the term 'data' should be understood in the wide sense to mean any information whatsoever transmitted in a digital telecommunications system. The information can comprise speech encoded into digital form, data communication between computers, telefax data, short segments of program code, etc. The SGSN node can be located at a base station BTS, at a base station controller BSC or at a mobile switching centre MSC, or it can be separate from all these elements. The interface between the SGSN node and the base station controller BSC is called a GB interface. An area managed by one base station controller BSC is called a Base Station Subsystem BSS.

The intermediate mobile network provides packet-switched data transmission between a support node and mobile data terminal equipment. Different sub-networks, in turn, are connected to an external data network, for example to a PSPDN, via specific Gateway GPRS Support Nodes GGSN. Packet data transmission between mobile data terminals and external data networks is thus effected by means of the GPRS service, while the GSM network functions as an access network. Alternatively, the gateway node GGSN can be replaced with a router. In the following, the term 'gateway node GGSN' is also to be understood as referring to a structure in which the gateway has been replaced with a router.

In FIG. 1 the GPRS network connected to the GSM network comprises a number of serving GPRS support nodes and one gateway GPRS support node GGSN. The different support nodes SGSN and GGSN are interconnected via an intra-operator backbone network. It is to be understood that a GPRS network may comprise any number of support nodes SGSN and gateway nodes GGSN.

Each support node SGSN manages a packet data service in the area of one or more nodes in a cellular packet radio network. To achieve this, each support node SGSN is connected to a certain local part of the GSM system, typically to a mobile services switching centre, but in some situations it may be preferable to connect it directly to a base station subsystem BSS, i.e. to a base station controller BSC or a base station BTS. A mobile station MS in a cell communicates with a base station BTS over a radio interface and further through a mobile network with the support node SGSN to the service area of which the cell belongs. In principle, the mobile network between the support node SGSN and the mobile station MS only transmits packets between these two. For this purpose, the mobile network can offer either a circuit-switched connection or packet-switched data packet transmission between a mobile station MS and a serving support node SGSN. An example for a circuit-switched connection between a mobile station MS and an agent is presented in WO 95/08900. An example for packet-switched data transmission between a mobile station MS and an agent is presented WO 95/20283. It should be noted, however, that a mobile network provides only a physical connection between a mobile station MS and a support node SGSN, and that its exact operation and structure are not relevant to the present invention.

An intra-operator backbone network 11 interconnecting the operator's SGSN and GGSN can be implemented, for example, using a local area network. It should be noted that it is also possible to implement the operator's GPRS network without an intra-operator backbone network, for example, by implementing all the features in a single computer, but this does not cause any changes in the call set-up principles according to the present invention.

A gateway GPRS node GGSN connects the operator's GPRS network to the other operators' GPRS networks and to data networks, such as an inter-operator backbone network 12 or an IP network. An Interworking Function IWF can be arranged between the gateway node GGSN and the other networks, but usually the GGSN is simultaneously the IWF. The inter-operator backbone network 12 is one through which the gateway nodes GGSN of different operators can communicate with one another. The communication is needed to support the GPRS roaming between the different GPRS networks.

The gateway node GGSN is also used for storing the location information of the GPRS mobile stations. The GGSN also routes mobile-terminated (MT) data packets. The GGSN also contains a database that associates the mobile station's network address, for example in an IP network or an X.25 network (or simultaneously in more than one network), and the mobile station identifier in a GPRS network. When the mobile station roams from one cell to another within the area of one support node SGSN, location updating is needed only in the support node SGSN, and the gateway node GGSN need not be informed of the change of location. When the mobile station roams from a cell of one support node SGSN to a cell of another SGSN within the area of the same or a different operator, location updating is also performed in the (home) gateway node GGSN so as to store the identifier of the new, visited support node and the identifier of the mobile station.

A home location register HLR is also used to authenticate subscribers at the beginning of a GPRS session. It contains a definition between a subscriber's PDP (Packet Data Protocol) address (addresses) and the subscriber's IMSI (International Mobile Subscriber Identity). In a GSM network a subscriber is identified on the basis of the IMSI. In FIG. 1 the HLR is connected through an SS7 (Signalling System 7), for example to a mobile switching centre MSC and an intra-operator backbone network. Between the SS7 signalling system and the intra-operator backbone network there can be a direct connection or an SS7 gateway. In principle, the HLR can exchange packet-switched messages with any GPRS node whatsoever. The HLR's method of communication and its connection to the GPRS network are not, however, essential to the invention.

In the above arrangement, packet-switched data (in short: packet data) can be transmitted to a mobile station over an air interface, when the mobile station, controlled by the network, has first been directed to a correct kind of channel, i.e. to a packet data transmission channel. A mobile station that supports packet data transmission can either be suited only to the transmission and reception of packet data ('GPRS only') or also to the transmission of conventional circuit-switched speech and other services ('multi-function terminal').

A 'GPRS only' mobile station can be in one of three different states in the sense of the present application: a ready, a standby, or an idle state. A mobile station in the ready state is connected to a data transmission channel and is ready to transmit and/or receive data packets. A mobile station is the standby state mode listens to a packet data paging channel, and after receiving its paging identifier the mobile station switches to the ready state. A mobile station in the idle state does not support transmission nor reception of packet data.

A multi-function terminal operates in the ready and standby states in the same way as the 'GPRS only' terminal, but in idle state it supports conventional circuit-switches services.

When packet data is sent to a mobile station, the data will be routed to the correct GSM network by routing it via the gateway node GGSN to the support node SGSN in which the location of the mobile station is known. If the mobile station is in the standby state, its location is known with the accuracy of a Routing Area RA. Correspondingly, if the mobile station is in the ready state, its location is known with the accuracy of a cell.

FIG. 2 illustrates registration of a mobile station in the system. FIG. 2 is taken from the ETSI specification GSM 03.60 (version 5.2.0). The previous support node SGSN and centre MSCNLR of the mobile station are called "the old ones" and their present counterparts are called "the new ones".

In step 2-1 the mobile station sends an ATTACH REQUEST message. Steps 2-2 to 2-5 are neither necessary nor essential to the invention, and thus they will not be described here. In step 2-6*a* the new SGSN sends an UPDATE LOCATION message to the home location register HLR, which in step 2-6*b* cancels the location (CANCEL LOCATION) from the old SGSN. In step 2-6*c* the old SGSN acknowledges (=ACK). In step 2-6*d* the new SGSN receives subscriber data from the home location register in a message INSERT SUBSCRIBER DATA and sends an acknowledgement in step 2-6*e*. In step 2-6*f* the new SGSN receives an acknowledgement to the update location message which was sent in step 2-6*a*.

In step 2-7*a* the new SGSN sends a LOCATION UPDATING REQUEST to the new centre MSCNLR. Steps 2-7*b* to 2-7*g* correspond to steps 2-6*a* to 2-6*f*. In step 2-7*h* the new SGSN receives an acknowledgement to the location updating request sent in step 2-7*a* from the new centre. In step 2-8 the new SGSN informs the mobile station of the fact that the attach request sent in step 2-1 has been accepted. The following steps are not essential to the invention, and thus they will not be explained more closely.

A problem related to the arrangement described above is that the GPRS side of the system has no subscriber-specific information on whether a certain subscriber has access to the service on the GSM side (MSC/VLR). When a mobile station PC/MS registers in the system, a combined GPRS/non-GPRS IMSI attach operation and possibly a location area/routing area (LA/RA) update to the visitor location register MSCNLR are carried out. This causes unnecessary signalling to the MSCNLR via the Gs interface and further to the home location register HLR via the MAP-D interface if the subscriber is only a GPRS subscriber.

A parallel problem arises when the GSM side of the system has no subscriber-specific information on whether a certain subscriber has access to the service on the GPRS side (SGSN). This causes unnecessary signalling if the VLR has lost the subscriber data. In the case of a mobile-terminating call, a page has to be always sent to each SGSN node since the MSCNLR does not know whether the subscriber has a GPRS service or not.

BRIEF DESCRIPTION OF THE INVENTION

It is an object of the invention to provide a method and an apparatus implementing the method, eliminating the abovementioned problems related to unnecessary signalling. The objects of the invention are achieved by a method and an apparatus which are characterized by what is disclosed in the independent claims. Preferred embodiments of the invention are disclosed in the dependent claims.

First of all, the invention is based on finding the problem. Since the excessive signalling caused by conventional solutions does not necessarily cause actual error situations and GSM/GPRS networks are not in use yet, it is not that easy to detect the problem. In addition to finding the problem, the invention is based on finding a solution which causes as few compatibility problems and changes to the function of other network elements as possible. It is not desirable to make great changes to the definitions of network elements because of a relatively small problem.

The invention comprises maintaining a subscriber-specific access parameter, which indicates what rights the subscriber in question has in both networks. The access parameter is transmitted to a relevant network element on registration in the system. The advantages of the invention, such as decrease of the signalling load, are the greatest if the first network and the second network have clearly different architectures. This is the case for example when the first network is a circuit-switched network (such as GSM, DSC, etc.) and the second network is a packet-switched network (such as GPRS).

An advantage of the method and arrangement of the invention is that they solve a non-obvious problem in a simple manner. In other words, the invention eliminates unnecessary signalling load when a mobile station registers in the system. The invention also surprisingly provides a solution to several other separate problems, as will be described below.

According to a first embodiment of the invention, the subscriber-specific access parameter is maintained in the home location register. An advantage of this embodiment is that no changes are needed in the mobile stations and their SIM cards.

According to a second embodiment of the invention, the subscriber-specific access parameter is maintained in the mobile station, in particular in its SIM card (Subscriber Identity Module). An advantage of this embodiment is that the signalling load decreases considerably. On the other hand, changes have to be made to the mobile stations, at least to their SIM cards.

BRIEF DESCRIPTION OF THE DRAWINGS

The invention will be described in greater detail by means of preferred embodiments with reference to the accompanying drawings, in which.

DETAILED DESCRIPTION OF THE INVENTION

Figure 1:
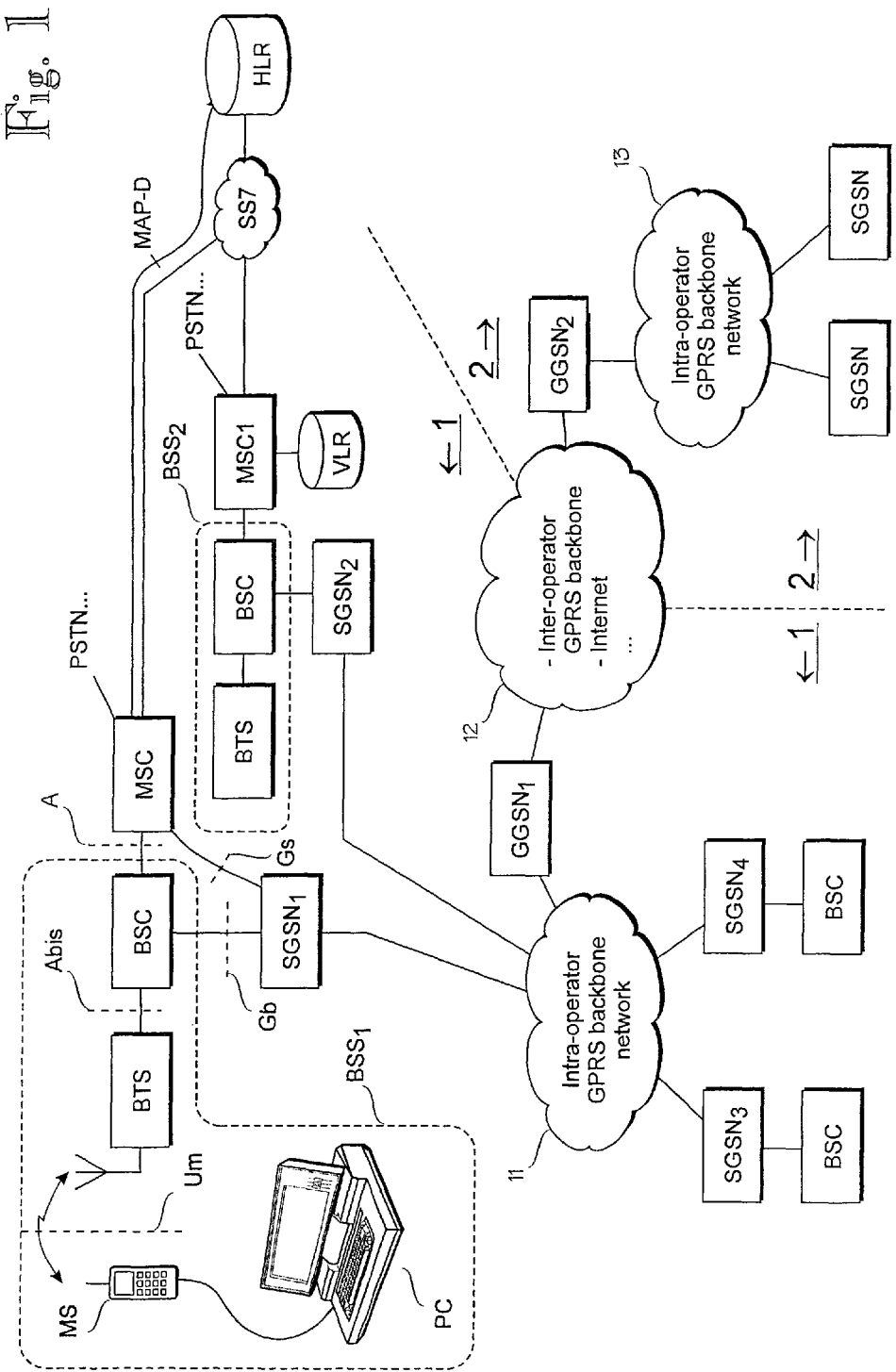
FIG. 1 illustrates an architecture of a GSM/GPRS system.
Figure 2:
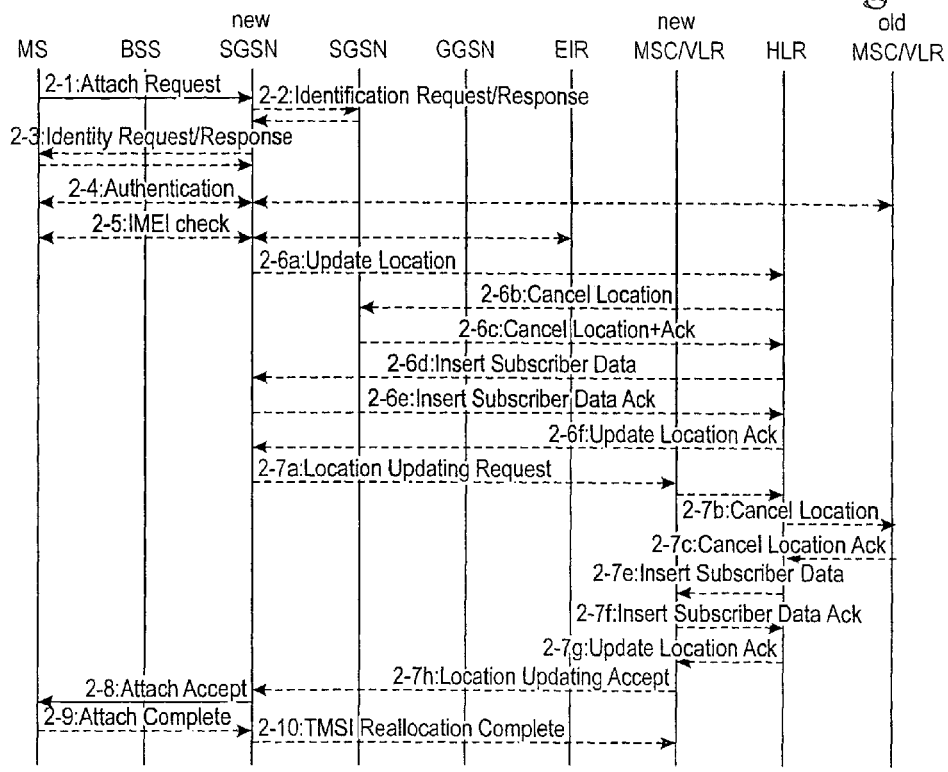
FIG. 2 illustrates registration of a mobile station in the system according to the prior art.
Figure 3:
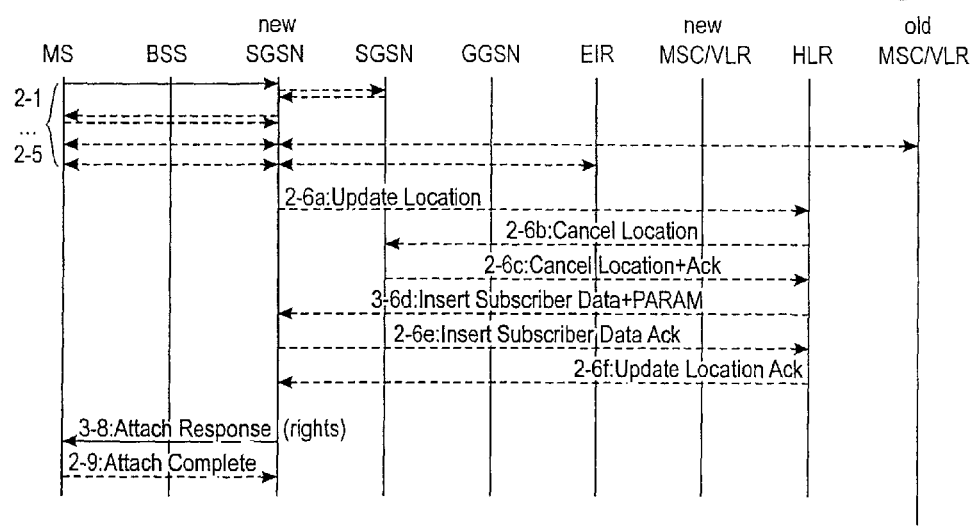
FIG. 3 illustrates registration of a mobile station in the system according to a first embodiment of the invention.

FIG. 3 illustrates registration of a mobile station in the system according to the solution of the invention. In FIG. 3 the same numbers have the same significance as in FIG. 2, except when there are some changes in the messages, in which case the first number of a message is 3. An access parameter PARAM of the invention indicates whether the subscriber has access to the GSM network, the GPRS network or to both networks. According to a first embodiment, the access parameter is maintained in the subscriber data of the home location register HLR. In the figure message 3-6$d$ corresponds to message 2-6$d$ described in connection with FIG. 2, except that an access parameter PARAM according to the invention is associated with message 3-6$d$. In this case it is assumed that the subscriber has access only to the GPRS network. Since the new SGSN knows that the subscriber has no access to the GSM network, steps 2-7$a$ to 2-7$h$ are not needed at all when the solution of the invention is used. Instead of message 2-8, message 3-8 ATTACH RESPONSE is used, which conveys information to the mobile subscriber on the fact that he has only GPRS rights. Message 2-10 is not needed. It is not necessary to transmit data on a subscriber who has no GSM rights to the visitor location register of the new centre.

According to a second embodiment of the invention, the subscriber-specific access parameter is maintained in the mobile station, particularly in its SIM card. In that case, a mobile station whose SIM card has information only on the GPRS rights decides independently not to even try to register in the GSM network. Decrease of the signalling load is complete since there would be no signals in a signalling chart corresponding to FIG. 3.

Figure 4:
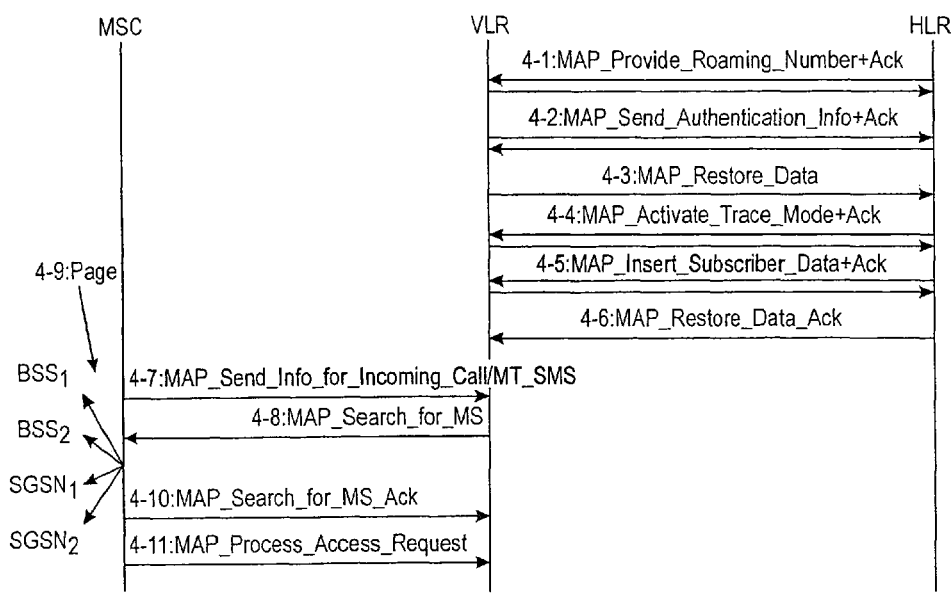
FIG. 4 illustrates how the invention solves a separate problem which arises when the data of the visitor location register disappear.

FIG. 4 illustrates how the invention solves another separate problem. FIG. 4 illustrates set-up of a mobile terminating call when the data of the visitor location register VLR have disappeared, for example during equipment maintenance or program updating. In step 4-1 the HLR requests a roaming number from the VLR. In step 4-2 the VLR requests authentication data from the HLR. In step 4-3 the VLR requests the HLR to send back the lost data. In optional step 4-4 the subscriber is set under trace. In step 4-5 the HLR sends the subscriber data to the VLR in the message INSERT SUBSCRIBER DATA. (The access parameter PARAM illustrated in step 4-5 does not exist in the functionality according to the prior art.) In step 4-7 the mobile station MS receives a mobile-terminating call or a short message via the centre MSC. However, the visitor location register does not have subscriber location data, and thus in step 4-8 it requests the centre to search for the mobile station (SEARCH FOR MS). According to the prior art, a page has to be sent to the mobile station in step 4-9 via each of the base station systems $BSS_1$ to $BSS_n$ under the centre MSC and also via each of the support nodes $SGSN_1$ to $SGSN_n$.

According to the invention, the above-described subscriber-specific access parameter PARAM, which indicates whether the subscriber has access to the GSM network, the GPRS network or to both networks, is associated with message 4-5. In step 4-9 paging of a mobile station can be substantially reduced if paging is limited to the network (GSM and/or GPRS) to which the subscriber in question has access. If the subscriber has no access to the GPRS network, paging via the SGSN nodes is unnecessary.

The invention also solves other problems. According to the prior art, an operator cannot explicitly restrict the access of a subscriber to only one network if the subscriber has a short message service SMS in use because the same subscriber data are valid both on the GSM and the GPRS sides of the network. Since the subscriber can register both in the GSM and the GPRS networks, he may reserve resources from both networks (e.g. from temporary registers), even though the services of only one network were available to the subscriber in addition to the short message service (e.g. only GSM+SMS or GPRS+SMS).

Since according to the invention the parameter indicating to which network the subscriber has access (GSM, GPRS or both) can be set explicitly for the subscriber, the operator may optimize the use of the system. This particularly concerns subscribers to the short message service. According to the prior art, the SMS subscription in the home location register enables access both to the GSM and the GPRS networks. According to the invention, the operator may optimize the use of the system by setting the subscribers who have access only to the GPRS network and short message service to the state "only GPRS network allowed".

The invention also reduces the use of network resources by preventing a subscriber from registering in a wrong network (GSM or GPRS). If the subscriber is for example a GPRS subscriber without the short message service, he may try to register in the GSM network, which loads the network unnecessarily.

It is obvious to a person skilled in the art that as the technology advances, the inventive concept can be implemented in several different ways. Thus the invention and its embodiments are not limited to the examples describe above, but may vary within the scope of the claims.

The invention claimed is:

1. A method of registering a multimode mobile station in a telecommunications system, wherein the telecommunications system comprises a home location register for maintaining mobile subscriber data and supports a first network and a second network of a different type, the method comprising:
   in the home location register, maintaining the mobile subscriber data and receiving, from another network element, a message for requesting the mobile subscriber data, the mobile subscriber data comprising address information for accessing the mobile subscriber via the first and the second network of the different type;
   the home location register maintaining a subscriber-specific access parameter which indicates, independently of the address information, whether the mobile subscriber has access rights to the first network and/or the second network of the different type;
   wherein the first network and second network are provided by a common operator; and
   in response to said message for requesting the mobile subscriber data, the home location register sends the mobile subscriber data and also said subscriber-specific access parameter;
   wherein the network element that requested the mobile subscriber data is operable to use said subscriber-specific access parameter for restricting the location updating of the mobile station only to the first network or to the second network of the different type.

2. A method according to claim 1, wherein the mobile subscriber's access can be restricted only to one network even though a short message service had been defined for the mobile subscriber.

3. A method according to claim 1, wherein the telecommunications system comprises a visitor location register; and
   when the mobile station is in the area of the visitor location register and receives a call or a short message and the visitor location register does not have data of the mobile subscriber, said subscriber-specific access parameter is used for restricting paging of the mobile station only to a network which the mobile subscriber has access rights to.

4. A method according to claim 1, wherein the first network is a circuit-switched network and the second network is a packet-switched network and wherein one mode of the multimode mobile station supports the circuit-switched network and another mode supports the packet-switched network.

5. A method of registering a multimode mobile station in a telecommunications system, wherein the telecommunications system comprises a home location register for maintaining mobile subscriber data and supports a first network and a second network of a different type, wherein the first network and second network are provided by a common operator, the mobile subscriber data comprising address information for accessing the mobile subscriber via the first and the second network and a subscriber-specific access parameter indicating, independently of the address information, whether the mobile subscriber has access rights to the first network and/or the second network of the different type, the method comprising:
   sending from another network element to the home location register a message for requesting the mobile subscriber data, the mobile subscriber data comprising said subscriber-specific access parameter indicating, independently of the address information, whether the mobile subscriber has access rights to the first network and/or the second network of the different type;
   the network element that requested the mobile subscriber data using said subscriber-specific access parameter to restrict a location update of the mobile station only to the first and/or the second network of the different type.

6. A method according to claim 5, wherein the first network is a circuit-switched network and the second network is a packet-switched network and wherein one mode of the multimode mobile station supports the circuit-switched network and another mode supports the packet-switched network.

7. A home location register configured to operate in a telecommunications system that supports multimode mobile stations and which comprises a first network and a second network of a different type, the first and second networks being provided by a common operator, the home location register comprising:
   a processor; and
   a memory operatively connected to the processor and configured to store mobile subscriber data for registering a multimode mobile station, the mobile subscriber data comprising address information for accessing the mobile station via the first and the second network; and
   a subscriber-specific access parameter which indicates, independently of the address information, whether a mobile subscriber to whom the mobile station has been registered has access rights to the first network and/or the second network of the different type;
   wherein the processor is configured to receive, from another network element, a location update message for the mobile station and to send the mobile subscriber data and said subscriber-specific access parameter as a response to said location update message.

8. A home location register according to claim 7, wherein the first and second networks share a common home location register.

9. A home location register according to claim 7, wherein the first network is a circuit-switched network and the second network is a packet-switched network and wherein one mode of the multimode mobile station supports the circuit-switched network and another mode supports the packet-switched network.

10. A network element configured to operate in a telecommunications system which supports a first network and a second network of a different type, and multimode mobile stations, wherein the telecommunications system comprises a home location register for maintaining mobile subscriber data for registering a multimode mobile station in the telecommunications system, the mobile subscriber data comprising address information for accessing the mobile subscriber via the first and the second network and a subscriber-specific access parameter indicating, independently of the address information, whether the mobile subscriber has access rights to the first network and/or the second network of the different type, the network element comprising:
a processor configured to:
send, to the home location register, a message for location updating of the mobile subscriber station;
receive the mobile subscriber data and said subscriber-specific access parameter as a response to said message;
use said subscriber-specific access parameter to restrict location updating of the mobile station only to the first and/or the second network;
wherein the first network and second network are provided by a common operator.

11. A network element according to claim 10, wherein the first and second networks share a common home location register.

12. A network element according to claim 10, wherein the first network is a circuit-switched network and the second network is a packet-switched network and wherein one mode of the multimode mobile station supports the circuit-switched network and another mode supports the packet-switched network.

13. A method of registering a multimode mobile station in a telecommunications system, wherein the telecommunications system comprises home location register for maintaining mobile subscriber data and supports a first network and a second network of different type, the method comprising:
at the home location register, maintaining the mobile subscriber data and receiving, from another network element, a message for requesting the mobile subscriber data, the mobile subscriber data comprising address information for accessing the mobile subscriber via the first and the second network of different type;
the home location register maintaining a subscriber-specific access parameter which indicates, independently of the address information, whether the mobile subscriber has access rights to the first network and/or the second network of different type;
wherein the first network and second network are provided by a common operator; and
in response to said message for requesting the mobile subscriber data, the home location register sending the mobile subscriber data and also said subscriber specific access parameter;
wherein the network element that requested the mobile subscriber data is operable to use said subscriber-specific access parameter for restricting paging of the mobile station only to the first network or to the second network of different type.

14. The method of claim 13, wherein the first network is a circuit-switched network and the second network of the different type is a packet-switched network.

15. A method of registering a multimode mobile station in a telecommunications system, wherein the telecommunications system comprises a home location register that maintains mobile subscriber data and supports a first network and a second network of a different type, wherein the first network and the second network are provided by a common operator, the mobile subscriber data comprising address information for accessing the mobile subscriber via the first and the second network and a subscriber-specific access parameter indicating, independently of the address information whether the mobile subscriber has access rights to the first network and/or the second network of different type, the method comprising:
sending from another network element to the home location register a message for requesting the mobile subscriber data, the mobile subscriber data comprising said subscriber-specific access parameter indicating, independently of the address information whether the mobile subscriber has access rights to the first network and/or the second network of the different type;
the network element that requested the mobile subscriber data using said subscriber-specific access parameter to restrict paging of the mobile station only to the first and/or the second network of different type.

16. A home location register configured to operate in a telecommunications system which supports multimode mobile stations and which comprises a first network and a second network of a different type, the first network and second network provided by a common operator, the home location register comprising:
a processor; and
a memory structured to store mobile subscriber data for registering a multimode mobile station, the mobile subscriber data comprising address information for accessing the mobile station via the first and second network, and a subscriber-specific access parameter which indicates, independently of the address information, whether a mobile subscriber to whom the mobile station has been registered has access rights to the first network and/or the second network of different type;
the processor being configured to receive, from another network element, a message for restoration of the mobile subscriber data and to send the mobile subscriber data and said subscriber-specific access parameter to the network element in response to said message.

* * * * *